United States Patent
Kurumisawa et al.

(10) Patent No.: US 7,974,469 B2
(45) Date of Patent: Jul. 5, 2011

(54) IMAGE PROCESSING APPARATUS, IMAGE PROCESSING METHOD, AND IMAGE PROCESSING PROGRAM FOR SUPERIOR IMAGE OUTPUT

(75) Inventors: Takashi Kurumisawa, Shiojiri (JP); Masanori Ishida, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 12/694,711

(22) Filed: Jan. 27, 2010

(65) Prior Publication Data

US 2010/0128981 A1    May 27, 2010

Related U.S. Application Data

(62) Division of application No. 11/300,395, filed on Dec. 15, 2005, now abandoned.

(30) Foreign Application Priority Data

Dec. 24, 2004 (JP) ................................. 2004-372743

(51) Int. Cl.
*G06K 9/00* (2006.01)
(52) U.S. Cl. ....................................... 382/167
(58) Field of Classification Search .................. None
See application file for complete search history.

(56) References Cited

U.S. PATENT DOCUMENTS

| | | | |
|---|---|---|---|
| 5,668,890 A | 9/1997 | Winkelman | |
| 5,774,578 A * | 6/1998 | Shimizu | 382/170 |
| 6,219,447 B1 | 4/2001 | Lee | |
| 6,377,702 B1 | 4/2002 | Cooper | |
| 6,529,630 B1 * | 3/2003 | Kinjo | 382/190 |
| 6,587,593 B1 | 7/2003 | Matsuoka et al. | |
| 6,788,813 B2 | 9/2004 | Cooper | |
| 6,816,613 B2 | 11/2004 | Tohyama et al. | |
| 6,853,747 B1 | 2/2005 | Matsuura et al. | |
| 6,859,552 B2 | 2/2005 | Izume et al. | |
| 6,947,594 B2 | 9/2005 | Watanabe et al. | |
| 6,954,549 B2 * | 10/2005 | Kraft | 382/167 |
| 7,012,625 B1 | 3/2006 | Kobayashi et al. | |
| 7,042,602 B1 * | 5/2006 | Yang et al. | 358/518 |
| 7,167,597 B2 | 1/2007 | Matsushima | |
| 7,411,698 B2 | 8/2008 | Gallina | |
| 7,457,465 B2 | 11/2008 | Tomiyama et al. | |
| 7,616,233 B2 * | 11/2009 | Steinberg et al. | 348/222.1 |
| 7,778,483 B2 * | 8/2010 | Messina et al. | 382/274 |
| 2004/0175034 A1 * | 9/2004 | Wiemker et al. | 382/173 |
| 2004/0189818 A1 | 9/2004 | Tsuruoka et al. | |
| 2004/0213457 A1 * | 10/2004 | Mori | 382/167 |
| 2005/0057776 A1 | 3/2005 | Furukawa et al. | |
| 2006/0215034 A1 | 9/2006 | Nakabayashi et al. | |

FOREIGN PATENT DOCUMENTS

| | | |
|---|---|---|
| JP | A-07-288840 | 10/1995 |
| JP | A-2002-010073 | 1/2002 |

(Continued)

*Primary Examiner* — Yuzhen Ge
(74) *Attorney, Agent, or Firm* — Oliff & Berridge, PLC

(57) ABSTRACT

An image processing apparatus includes the following elements. An image data obtaining unit obtains image data. A sampling unit samples the image data. A statistic value determining unit determines a statistic value based on statistic information in a histogram with respect to a grayscale value of image data that is obtained by performing rough quantization and linear interpolation on the sampled image data. A correction-amount determining unit determines a correction amount to be used for image processing based on the statistic value. An image processing unit performs the image processing according to the correction amount.

6 Claims, 15 Drawing Sheets

FOREIGN PATENT DOCUMENTS

| | | |
|---|---|---|
| JP | A-2002-163653 | 6/2002 |
| JP | A-2002-281312 | 9/2002 |
| JP | A-2003-052002 | 2/2003 |
| JP | A-2004-297698 | 10/2004 |

\* cited by examiner

FIG. 3

PHOTOGRAPHIC INFORMATION SI

IMAGE PROCESSING
CONTROL INFORMATION GI

IMAGE DATA GD

FIG. 11

| RESOLUTION STANDARD | XGA | VGA | QVGA | QQVGA |
|---|---|---|---|---|
| FULL-SCREEN RESOLUTION (DOTS) | 1024 × 768 | 640 × 480 | 320 × 240 | 160 × 120 |
| RESOLUTION OF CENTRAL-AREA SUB-REGION (DOTS) | 205 × 154 | 128 × 96 | 64 × 48 | 32 × 24 |
| RESOLUTION OF SURROUNDING-AREA SUB-REGION (DOTS) | 512 × 384 | 320 × 240 | 160 × 120 | 64 × 48 |

FIG. 13

| RESOLUTION STANDARD | XGA | VGA | QVGA | QQVGA |
|---|---|---|---|---|
| NUMBER OF ALL PIXELS (DOTS) | 786,432 | 307,200 | 76,800 | 19,200 |
| NUMBER OF PIXELS IN CENTRAL AREA (FOR EACH SUB-REGION) (DOTS) | 31,457 | 12,288 | 3,072 | 768 |
| NUMBER OF PIXELS IN SURROUNDING AREA (FOR EACH SUB-REGION) (DOTS) | 125,829 | 49,152 | 12,288 | 3,072 |
| NUMBER OF PIXELS IN CENTRAL AREA/256 | 123 | 48 | 12 | 3 |
| NUMBER OF PIXELS IN SURROUNDING AREA/256 | 492 | 192 | 48 | 12 |
| NUMBER OF PIXELS IN CENTRAL AREA/128 | 246 | 96 | 24 | 6 |
| NUMBER OF PIXELS IN SURROUNDING AREA/128 | 984 | 384 | 96 | 24 |
| NUMBER OF PIXELS IN CENTRAL AREA/64 | 492 | 192 | 48 | 12 |
| NUMBER OF PIXELS IN SURROUNDING AREA/64 | 1,966 | 768 | 192 | 48 |
| NUMBER OF PIXELS IN CENTRAL AREA/32 | 986 | 384 | 96 | 24 |
| NUMBER OF PIXELS IN SURROUNDING AREA/32 | 3,932 | 1,536 | 384 | 96 |

IMAGE PROCESSING APPARATUS, IMAGE PROCESSING METHOD, AND IMAGE PROCESSING PROGRAM FOR SUPERIOR IMAGE OUTPUT

This is a Division of application Ser. No. 11/300,395 filed Dec. 15, 2005. The disclosure of the prior application is hereby incorporated by reference herein in its entirety.

BACKGROUND

1. Technical Field

The present invention relates to techniques for performing image processing on image data using sampled image data.

2. Related Art

There have been proposed techniques for associating image data with image processing control information containing image processing conditions of the image data, as disclosed in, for example, JP-A-2003-52002. The image processing control information is configured so that, depending on the combination of the image generating device, e.g., a digital still camera, and the output device, e.g., a printer, the quality of images output from the output device can be improved. By performing image processing (image-quality adjustment) on the image data according to the image processing control information (image processing conditions) associated with the image data, an image processing apparatus obtains output images reflecting the image output characteristics of the output device. In the image processing for the image data, an amount by which to correct the image data is determined based on statistic values of the image data.

In the related art, however, an operation of determining statistic values of image data places a large load on a control circuit. If the image data is sampled at a low resolution to determine the statistic values in order to reduce the load on the control circuit, the resolution of the sampled image data is low, and the accuracy of the statistic values is also low. It is therefore difficult to correctly derive the correction amount.

SUMMARY

An advantage of the invention is that, even in the case of low-resolution sampled image data, high-accuracy statistic values are determined to derive a correction amount appropriate for image processing.

According to an aspect of the invention, image processing apparatus includes the following elements. An image data obtaining unit obtains image data. A sampling unit samples the image data. A statistic value determining unit determines a statistic value based on statistic information in a histogram with respect to a grayscale value of image data that is obtained by performing rough quantization and linear interpolation on the sampled image data. A correction-amount determining unit determines a correction amount to be used for image processing based on the statistic value. An image processing unit performs the image processing according to the correction amount.

The image processing apparatus is incorporated in, for example, a portable device, a display device, a color printer, or the like, and performs image processing on image data obtained from the outside based on statistic values of the image data. The image processing apparatus samples the image data at a low resolution, performs rough quantization on the sampled image data, and performs linear interpolation of the number of pixels, thereby generating a histogram. The image processing apparatus determines a correction amount based on statistic values that are determined from statistic information in the generated histogram, and performs image processing on the image data. Thus, in the case of low-resolution sampled image data, the accuracy of the statistic values is high and the correction amount can correctly be derived.

According to another aspect of the invention, an image processing method includes obtaining image data, sampling the image data, determining a statistic value based on statistic information in a histogram with respect to a grayscale value of image data that is obtained by performing rough quantization and linear interpolation on the sampled image data, determining a correction amount to be used for image processing based on the statistic value, and performing the image processing according to the correction amount.

According to another aspect of the invention, an image processing program executed by an image processing apparatus including a control circuit causes the image processing apparatus to function as an image data obtaining unit that obtains image data, a sampling unit that samples the image data, a statistic value determining unit that determines a statistic value based on statistic information in a histogram with respect to a grayscale value of image data that is obtained by performing rough quantization and linear interpolation on the sampled image data, a correction-amount determining unit that determines a correction amount to be used for image processing based on the statistic value, and an image processing unit that performs the image processing based on the correction amount.

The image processing method and the image processing program also allow a high-accuracy statistic value and a precise correction amount to be derived in the case of low-resolution sampled image data.

In the image processing apparatus, the correction-amount determining unit may include a correction-amount adjusting unit that determines a ratio of pixels having a specific color in all pixels based on the sampled image data and that adjusts the correction amount according to the ratio of the pixels having the specific color. The specific color may be a memory color, such as the color of human skin or the color of sky, or a characteristic color, such as high-chroma colors. Since the correction amount is determined according to the ratio of the pixels having the specific color in the sampled image data, it is possible to appropriately correct the specific color in the image data.

In the image processing apparatus, an image defined by the image data may be divided into a central area and a surrounding area surrounding the central area, and the sampling unit may include a divisional area sampling unit that samples the central area and the surrounding area at a low resolution. Thus, high-speed backlit-image determination processing can be achieved without placing a load on a control circuit.

In the image processing apparatus, the correction-amount determining unit may include a backlit-image determining unit that determines whether or not the image data is backlit image data using the histogram and a statistic value that is determined based on sampled image data in the central area and the surrounding area. It is therefore possible to determine whether or not the original image data is backlit image data based on the sampled image data.

BRIEF DESCRIPTION OF THE DRAWINGS

The invention will be described with reference to the accompanying drawings, wherein like numbers reference like elements.

FIG. 3 is a schematic configuration diagram of image data GD in the embodiment.

FIG. 11 is a table showing the resolution of each central-area sub-region and each surrounding-area sub-region.

FIG. 13 is a table showing the number of pixels sampled in each central-area sub-region and each surrounding-area sub-region.

DESCRIPTION OF EXEMPLARY EMBODIMENTS

Figure 1:
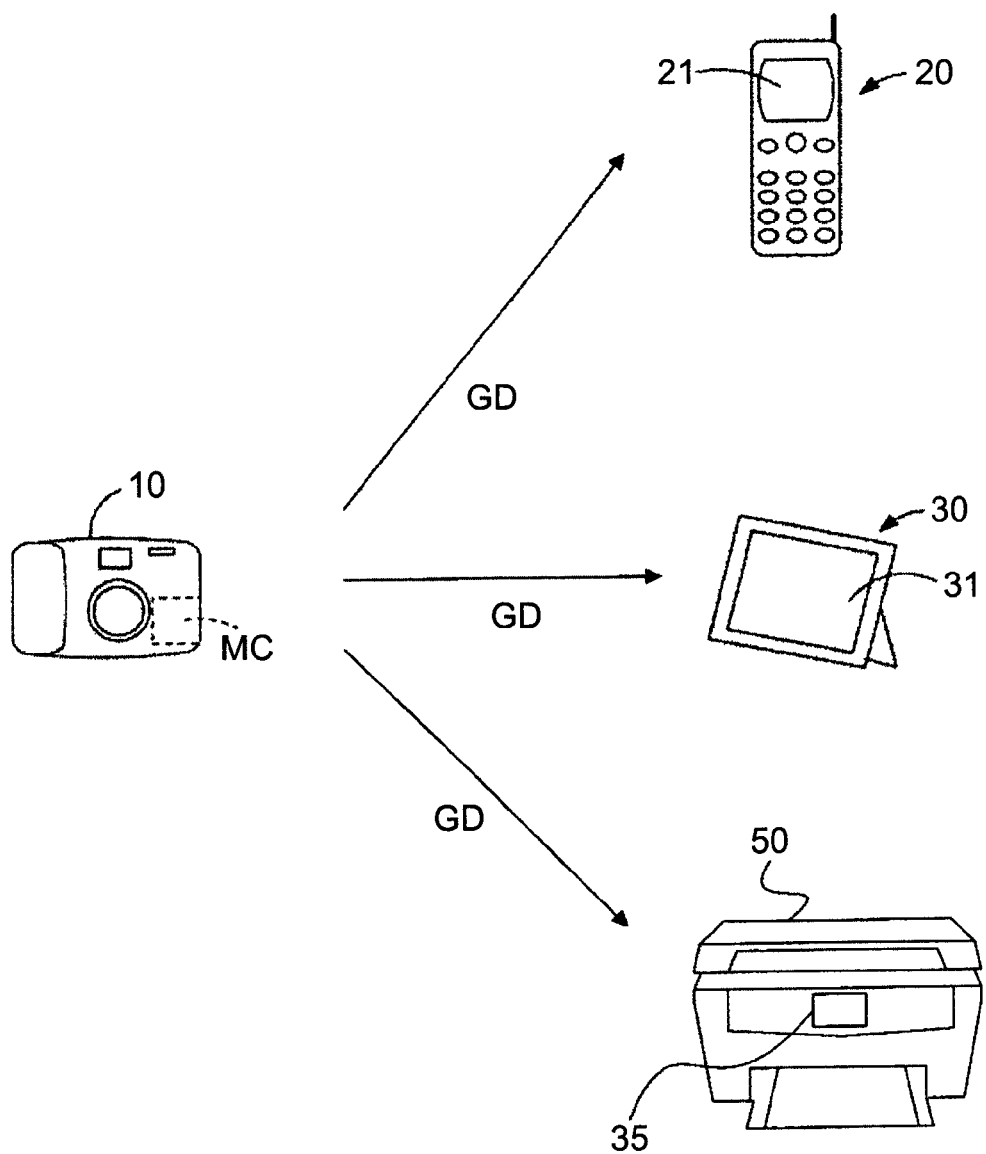
FIG. 1 is a schematic diagram of an image processing system including an image processing apparatus according to an embodiment of the invention.

An image processing apparatus and method and a display device and method according to an embodiment of the invention will be described below with reference to the drawings.
Schematic Configuration of Image Processing System An image processing apparatus (display device) according to an embodiment of the invention and an image processing system including the image processing apparatus (display device) will be described with reference to FIGS. 1 and 2. FIG. 1 schematically illustrates the configuration of the image processing system including the image processing apparatus according to this embodiment.

The image processing system includes a digital camera 10, a portable device 20, a display device 30, and a color printer 50. The digital camera 10 serves as an input device that generates image data. The portable device 20 serves as an image processing apparatus that performs image processing on image data GD using image processing control information GI associated with the image data GD, and also serves as a display image output device (display device) that outputs an image using the image data subjected to the image processing. The color printer 50 has functions of a print-image display and output apparatus that prints and outputs images, and functions of the display device and the image processing apparatus.

The digital camera 10 obtains an image by focusing optical information onto a digital device (photoelectric conversion element, such as a charge-coupled device (CCD) or a photo-multiplier). The digital camera 10 includes a photoelectric conversion circuit including a CCD for converting optical information into electrical information, an image obtaining circuit that obtains an image by controlling the photoelectric conversion circuit, and an image processing circuit that processes obtained digital image.

The digital camera 10 stores the obtained image as digital data in a memory card MC serving as a storage device. Typical image data storage formats for the digital camera 10 are lossy compression formats, such as JPEG, and lossless compression formats, such as TIFF. Other data formats, such as RAW, GIF, and BMP, may be used as storage formats.

When generating the image data GD, the digital camera 10 records photographic information SI and image processing control information GI in a header of the image data GD. The photographic information SI includes photographic conditions that are set during photographing. The image processing control information GI defines image processing conditions pre-stored in a memory (e.g., a read-only memory (ROM)) of the digital camera 10. The digital camera 10 stores the generated image data GD in the memory card MC or the like.

Figure 4:
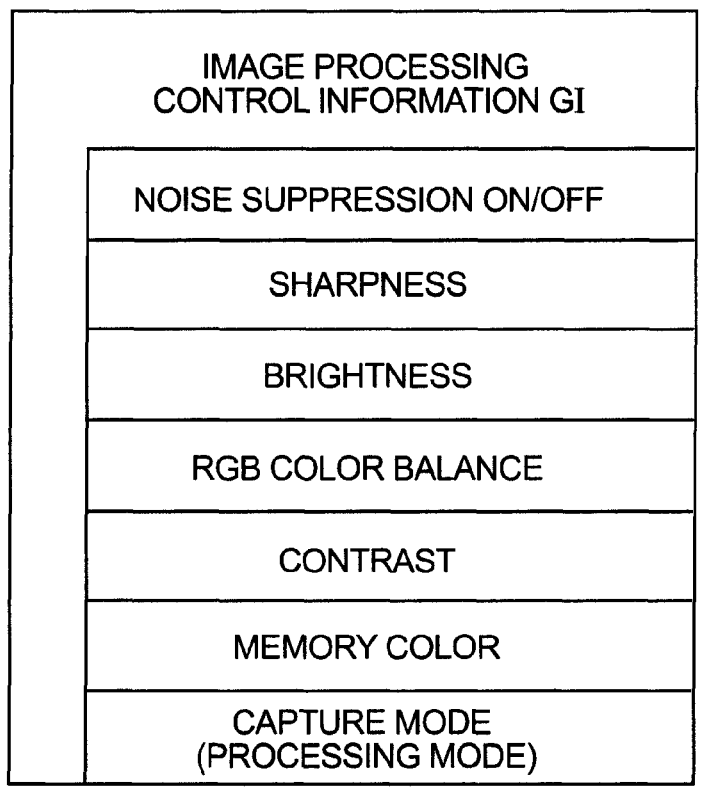
FIG. 4 is a diagram showing example parameters recorded as image processing control information GI.
Figure 5:
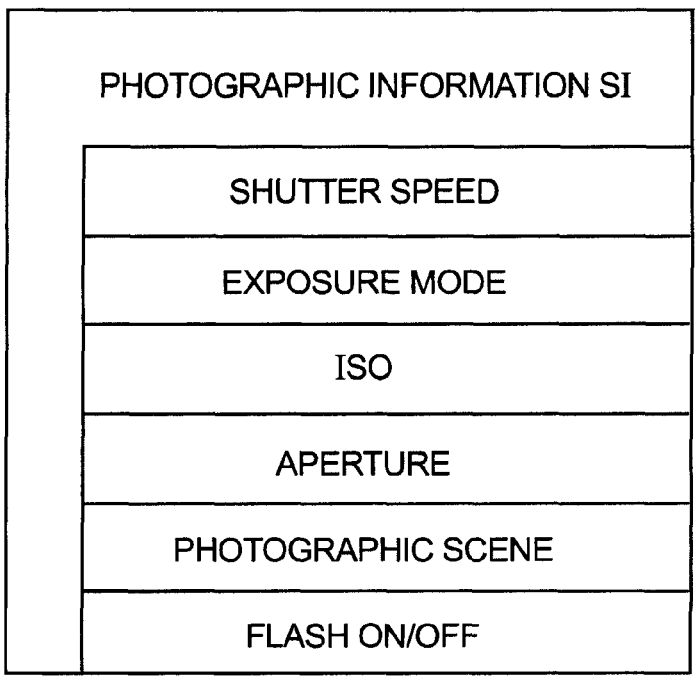
FIG. 5 is a diagram showing example parameters recorded as photographic information SI.

The structure of the image data GD used in the embodiment and example parameters recorded as the image processing control information GI and the photographic information SI will now be described with reference to FIGS. 3 to 5. FIG. 3 schematically illustrates the structure of the image data GD used in the embodiment. FIG. 4 illustrates example parameters recorded as the image processing control information GI. FIG. 5 illustrates example parameters recorded as the photographic information SI. For convenience of illustration, the data and information shown in FIGS. 3 to 5 conceptually represent, for example, data and information stored in a memory.

The image data GD includes the image processing control information GI that defines image processing conditions for image processing on the image data GD and the photographic information SI that represents photographic conditions for each image captured, and records them in, for example, the header of the image data GD. The image processing control information GI and the photographic information SI are therefore associated with the image data GD. The image processing control information GI is information that is experimentally determined so that a desired output image can be produced when image data generated by an image data generating device, e.g., the digital camera 10, is output from a predetermined image output device.

The parameters recorded as the photographic information SI may include, for example, but not be limited to, shutter speed, exposure mode, ISO, aperture, photographic scene type, flash ON/OFF, which are set for each image captured.

The parameters recorded as the image processing control information GI may include, for example, but not be limited to, noise suppression ON/OFF (noise suppression level), sharpness, brightness, RGB color balance, contrast, memory colors, and capture mode (image processing mode corresponding to the photographic conditions). The image processing control information GI is determined in view of, for example, the image data generating characteristics of the digital camera 10 that generates the image data GD and the image output characteristics of the print-image display and output device, which is a function of the color printer 50. Thus, if image data subjected to image processing using the image processing control information GI is output from an image output device having different image output characteristics from those of the print-image display and output device, this output image may be different from that output from the print-image display and output device. In this embodiment, therefore, adjustment information for adjusting the image processing control information GI depending on the image output characteristics of the image output device is used to eliminate or reduce the difference in quality between the output images. The adjustment information may be difference information for matching the image processing control information GI to the image output characteristics of the image output device, replacement information for replacing the image processing control information GI, or generation information for generating new image processing control information that is based on the image processing control information GI and that is matched to the image output characteristics of the image output device. The adjustment information may be included in the image processing control information GI or may be stored in a storage unit of each image output device.

The portable device 20 is a portable terminal having a relatively small display panel 21, and may be implemented by a cellular telephone, a personal digital assistant (PDA), or the like. The portable device 20 obtains image data from the digital camera 10 or a network server (not shown) via a storage medium, wireless communications such as infrared communications or radio communications, or a cable. The display panel 21 is a display panel having unique image output characteristics, e.g., a liquid crystal display panel or an organic electroluminescent (EL) display panel.

The display device 30 is a display device having a display panel 31 for displaying an image, such as an electronic photo frame. The display device 30 performs image processing on image data in a stand-alone manner, and displays an output image. The display device 30 obtains image data from the digital camera 10 or a network server (not shown) via a storage medium, wireless communications such as infrared communications or radio communications, or a cable. The display panel 31 is a display panel having unique image output characteristics, e.g., a liquid crystal display panel or an organic EL display panel.

The color printer 50 is a multi-functional color printer having functions of a print-image display and output device capable of outputting a color image and an image processing apparatus. A user can use the color printer 50 to directly perform image processing on the image data GD of the digital camera 10 to print the image data GD without connecting the color printer 50 to a personal computer or the like. The color printer 50 has a display panel 35 for displaying an image. The display panel 35 is similar to the display panel 31, and is used to allow the user to check (or "preview") an image to be printed before printing it. The color printer 50 that functions as an image processing apparatus performs image processing using the image processing control information GI according to each of the image output characteristics of the color printer 50 as a printer output device and the image output characteristics of the display panel 35. An image with a relatively large number of pixels is printed from the color printer 50 because of the high resolution of the color printer 50. On the other hand, the resolution of the display panel 21 of the portable device 20, the display panel 31 of the display device 30, or the built-in display panel 35 of the color printer 50 is not so high that a low-resolution image is generated and displayed on such a display panel. The low-resolution image may be generated by a low-resolution image generation method, such as a nearest-neighbor method, a linear interpolation method, or a cubic interpolation method. According to an embodiment of the invention, statistic information to be used for image processing is obtained from the low-resolution image, thereby achieving high-speed image processing. A method for generating a histogram for obtaining statistic information and a method for calculating statistic values are discussed below.

Figure 2A:
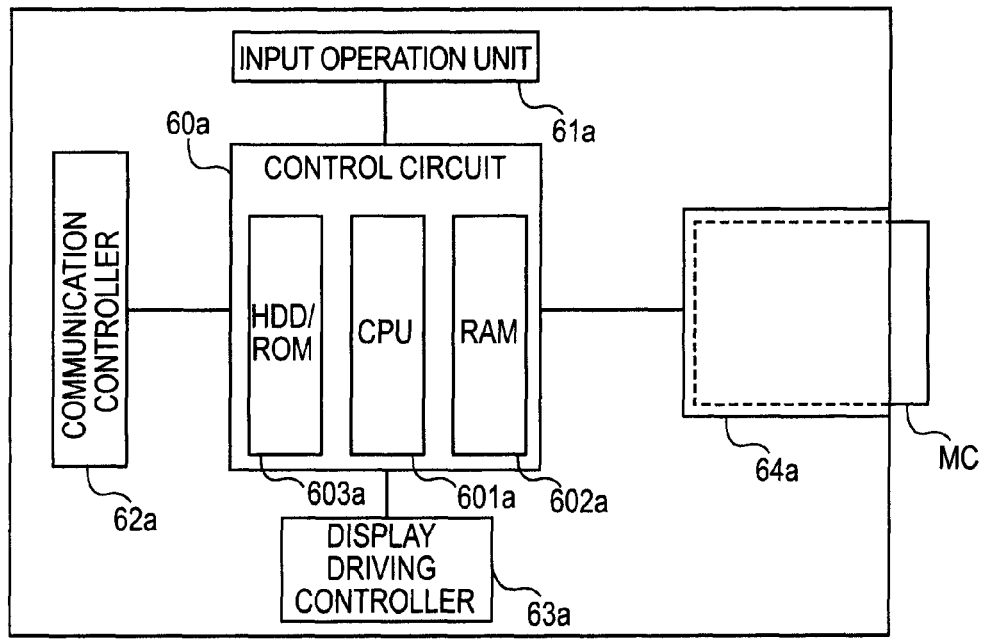
FIGS. 2A and 2B are schematic block diagrams of the image processing apparatus according to the embodiment.
Figure 2B:
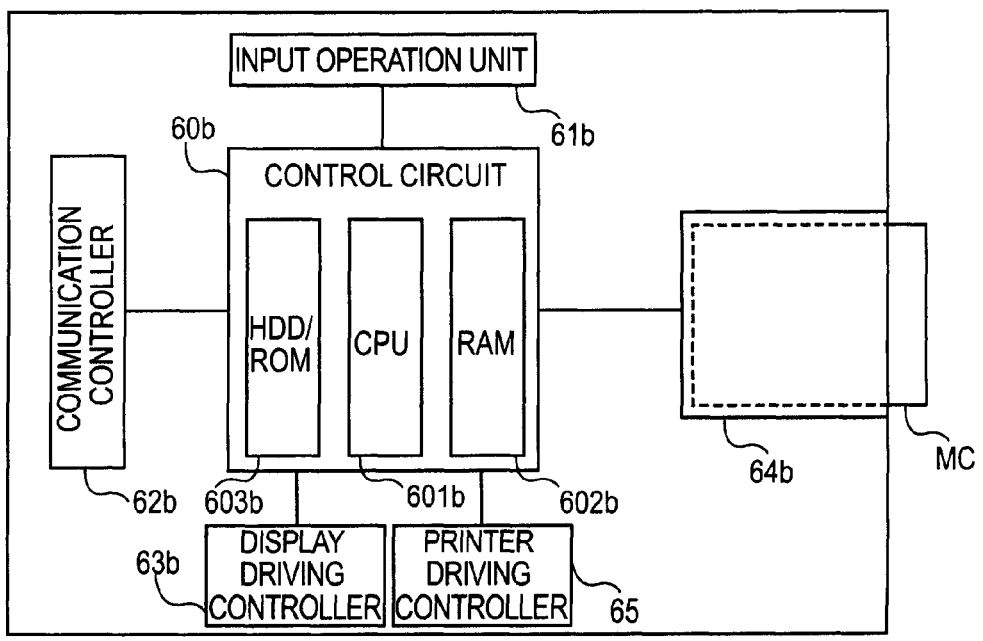

FIGS. 2A and 2B schematically illustrate the configuration of the portable device 20, the display device 30, and the color printer 50 according to this embodiment. FIG. 2A is a schematic diagram of the portable device 20 or the display device 30, and FIG. 2B is a schematic diagram of the color printer 50. Each of the portable device 20 and the display device 30 includes a control circuit 60a, an input operation unit 61a, a communication controller 62a, a display driving controller 63a, and a memory card slot 64a. The color printer 50 includes a control circuit 60b, an input operation unit 61b, a communication controller 62b, a display driving controller 63b, a memory card slot 64b, and a printer driving controller 65.

The control circuits 60a and 60b include central processing units (CPUs) 601a and 601b, random access memories (RAMs) 602a and 602b, and hard disk drives (HDDs) or ROMs 603a and 603b, respectively. The CPUs 601a and 601b execute various types of computation processing, such as image processing. The RAMs 602a and 602b temporarily store various data, such as input image data and computation results. The HDDs or ROMs 603a and 603b store programs executed by the CPUs 601a and 601b, an adjustment table for adjusting the image processing control information GI, and so forth.

The input operation units 61a and 61b are interfaces for receiving input from the outside, and are implemented as, for example, key operation units or scroll operation units. The display panels 31 and 35 may be used as touch-panel input operation units 61a and 61b, respectively.

The communication controllers 62a and 62b control communication for sending and receiving image data to and from the digital camera 10 or a network server. The communication controllers 62a and 62b perform desired communication in response to requests input via, for example, the input operation units 61a and 61b and the control circuits 60a and 60b.

The display driving controller 63a controls the displaying of output images on the display panel 21 or 31. The display driving controller 63b controls the drawing of output images to be displayed on the display panel 35. For example, when the display panels 31 and 35 are liquid crystal display panels, the display driving controllers 63a and 63b control the driving of the orientation of the liquid crystals based on output image data sent from the control circuits 60a and 60b to form dot patterns corresponding to the output image data.

The printer driving controller 65 causes an image to be output to a printing medium. For example, when the color printer 50 is an ink-jet printer, the color printer 50 forms dot patterns by ejecting four colors of ink, that is, cyan (C), magenta (M), yellow (Y), and black (K), onto a printing medium, thereby generating an image. When the color printer 50 is an electrophotographic printer, the color printer 50 generates an image by transferring and fixing color toner onto a printing medium. In addition to the four colors described above, ink colors including light cyan (LC), light magenta (LM), blue, and red may also be used.

Functional Configuration of Control Circuit

Figure 6:
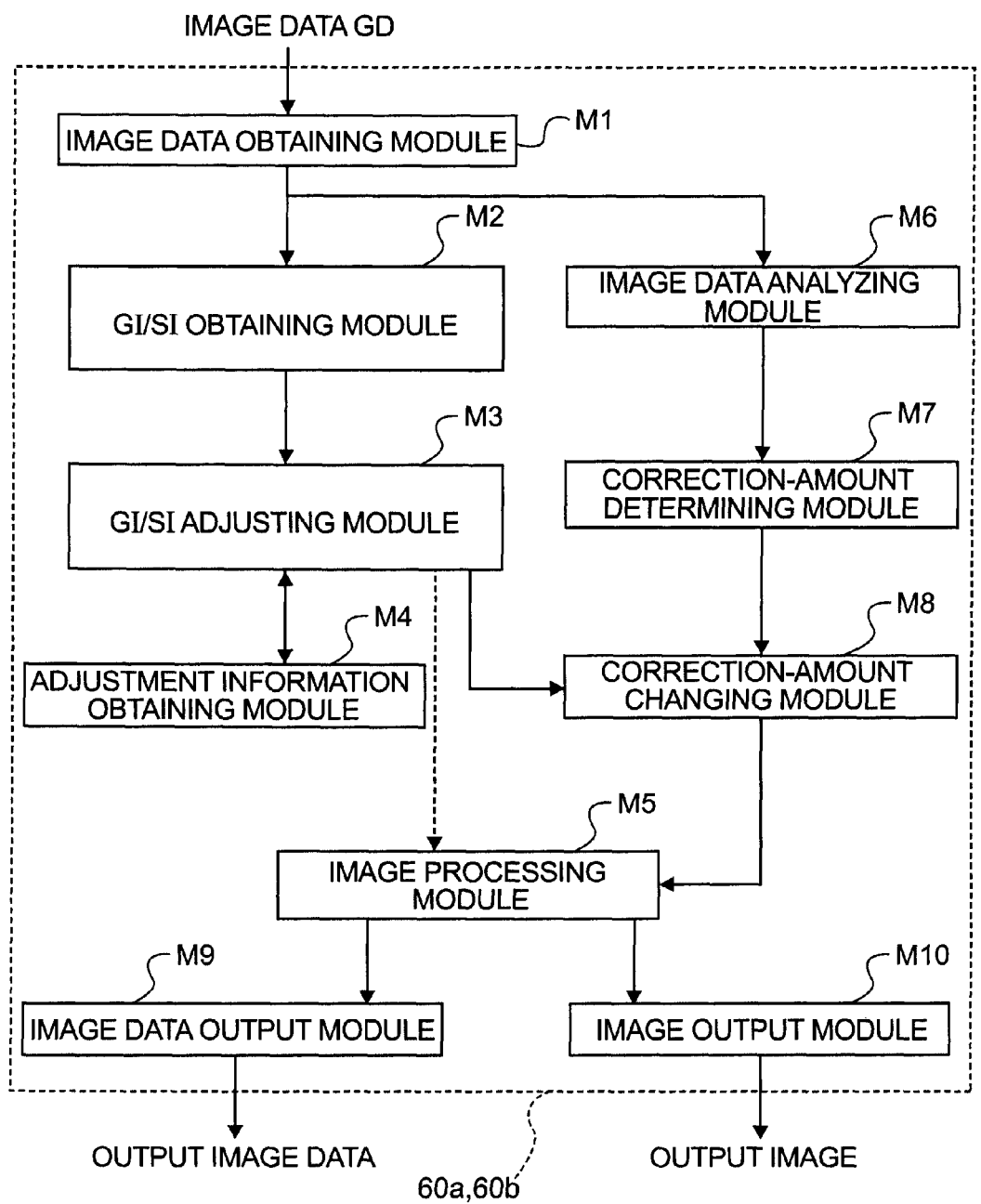
FIG. 6 is a block diagram of functional modules implemented by a control circuit 60 in a portable device or a display device according to the embodiment.

An overview of modules implemented by the control circuit 60a of the portable device 20 or the display device 30 or the control circuit 60b of the color printer 50 will now be described with reference to FIG. 6. FIG. 6 is a block diagram of functional modules implemented by the control circuit 60a of the portable device 20 or the display device 30 or the control circuit 60b of the color printer 50 according to this embodiment. The modules shown in FIG. 6 may be implemented by the CPU 601a or 601b solely or the control circuit 60a or 60b, and may be implemented by hardware or software. The functional modules described below can also be implemented by a personal computer by connecting the portable device 20, the display device 30, or the color printer 50 to the personal computer.

The image data GD to be subjected to image processing is obtained by an image data obtaining module M1.

The image processing control information GI and photographic information SI associated with the image data GD are obtained by an image-processing-control-information-GI-and-photographic-information-SI (hereinafter referred to as "GI/SI") obtaining module M2. The obtained image processing control information GI and photographic information SI are adjusted by a GI/SI adjusting module M3 depending on an image output device.

The image processing control information GI is generally configured so that an optimum output image (namely, the optimum image quality) can be obtained in connection with the relationship between a specific image data generating device, e.g., the digital camera 10, and a specific image output device. Thus, desirably, when an image output device different from the specific image output device performs image processing using the image processing control information GI, the image processing control information GI is adjusted in accordance with the image output characteristics of the different image output device.

The GI/SI adjusting module M3 adjusts the image processing control information GI and the photographic information SI using adjustment information that is obtained by an adjustment information obtaining module M4. The adjustment information may be included in the image processing control information GI or may be pre-recorded in the HDD/ROM 603a or 603b of the control circuit 60a or 60b.

In order to perform image processing on the image data GD using reference values, an image data analyzing module M6 samples the image data GD to determine a histogram, and determines an analytic value (statistic value and characteristic value) for each of the parameters (image quality parameters) relating to the quality of the image data GD based on the histogram.

A correction-amount determining module M7 determines an amount by which to correct the image data GD during the image processing using the analysis results.

The determined correction amount is changed by a correction-amount changing module M8 so as to reflect the image processing control information GI and photographic information SI adjusted using the adjustment information.

An image processing module M5 performs image processing on the image data GD using the changed correction amount. An image data output module M9 sends the image data GD subjected to the image processing, as output image data, to the display driving controller 63a or 63b. In a case where the control circuit 60a or 60b includes an image output module M10, the image data GD subjected to the image processing is output as an output image to the display panel 21, 31, or 35 or to a printing medium via the image output module M10.

Instead of using the changed correction amount, for example, the image processing module M5 may perform image processing using the parameters recorded as the adjusted image processing control information GI.

Method for Sampling Image Data

In the correction-amount determining processing performed in the correction-amount determining module M7, a correction amount to be used for automatic image-quality adjustment for allowing the parameters relating to the quality of the image data GD to be equal to or close to reference values is determined.

Thus, the image data analyzing module M6 samples the image data GD, and obtains an analytic value (statistic value and characteristic value) for each of the parameters (image quality parameters) relating to the quality of the image data GD from the sampled image data. The correction-amount determining module M7 obtains a preset reference value for each of the image quality parameters, and determines a correction amount for each of the image quality parameters using the reference value and the analytic value. More specifically, a correction amount for eliminating or reducing the difference between the analytic value and reference value for each of the image quality parameters is determined using an arithmetic expression preset for each of the image quality parameters. In this embodiment, therefore, correction values are determined depending on the quality of the image data GD by analyzing the characteristics of the image data GD.

As described above, the correction-amount determining processing is performed based on statistic values, which are one type of analytic values. Statistic values are determined based on the image data sampled from the image data GD. However, as in automatic exposure compensation of digital cameras, if an image is divided into several areas and the weighting for exposure compensation is changed depending on the area, the number of populations of each area is greatly reduced. As such, if image data is sampled at a low resolution, the reliability of the statistic values determined based on the image data is low. Due to the low reliability of the statistic values, the correction values determined based on the statistic values cause large errors, which thus hinders appropriate image correction.

Method for Generating Histogram

The statistic values are determined based on statistic information in a histogram of the image data GD. In order to determine the statistic values, first, the CPU 601a or 601b generates a histogram of the image data GD. It is necessary to keep the reliability of the characteristics in the histogram as high as possible to prevent the reduction of the reliability of the statistic values. A method for generating a histogram according to an embodiment of the invention will now be described.

Figure 7A:
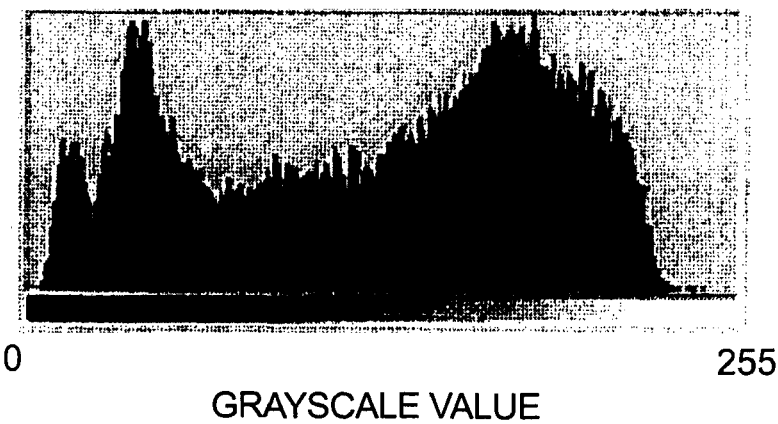
FIGS. 7A and 7B are histograms of sampled image data.
Figure 7B:
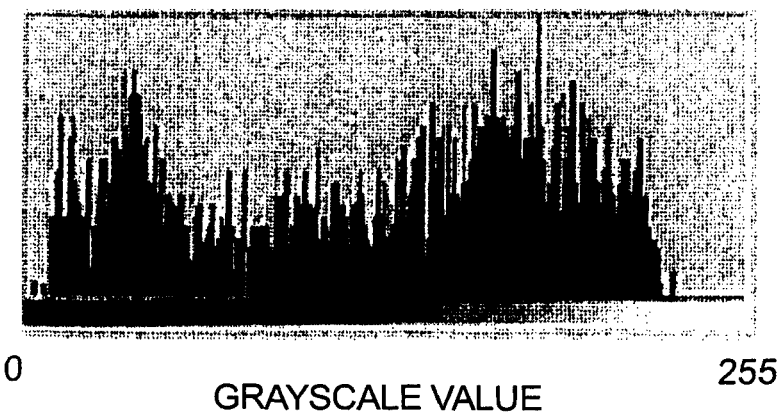

FIGS. 7A and 7B illustrate histograms of image data that are determined by sampling the image data GD at high and low resolutions. FIG. 7A is a histogram of high-resolution sampled image data, and FIG. 7B is a histogram of low-resolution sampled image data. In the histograms shown in FIGS. 7A and 7B, the x-axis represents grayscale values from 0 to 255, and the y-axis represents the number of pixels with grayscale values represented by the x-axis.

As can be seen from the comparison between FIGS. 7A and 7B, the histogram of low-resolution sampled image data shown in FIG. 7B exhibits a less smoothly varying pattern (or a more gap-toothed pattern) than the histogram of high-resolution sampled image data shown in FIG. 7A. As can be seen from the histogram shown in FIG. 7B, in low-resolution image data, variations of the grayscale values with respect to a small number of pixels largely affect the statistic values. The statistic values determined based on statistic information in such a histogram are not suitable for determining correction values to be used for appropriate image correction.

Figure 8A:
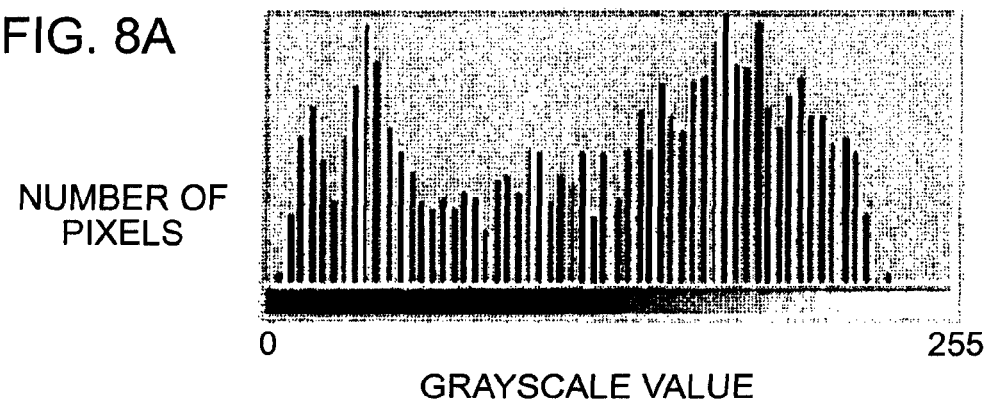
FIGS. 8A to 8C are histograms of sampled image data.
Figure 8B:
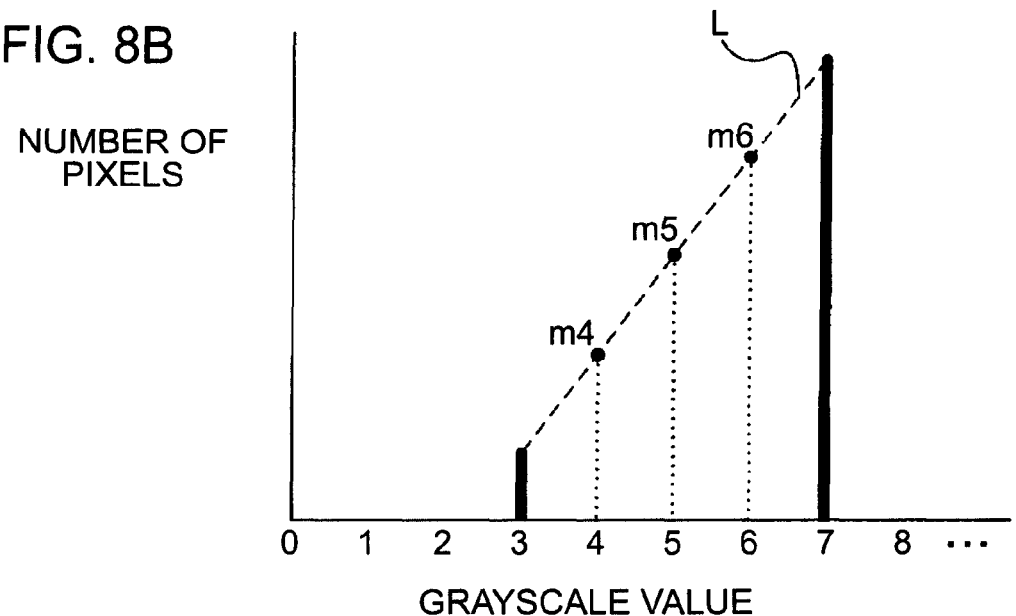

In such a case of low-resolution image data, first, rough quantization is applied to grayscale values. More specifically, the pixels are quantized using 64 grayscale values. FIG. 8A is a histogram of image data in the case of performing quantization using 64 grayscale values. By "performing quantization using 64 grayscale values", it is meant that, instead of determining the numbers of pixels for all 256 grayscale values from 0 to 255, the number of pixels for every four grayscale values is determined as the number of pixels for one of the four grayscale values. FIG. 8B is an enlarged histogram of image data in the case of performing quantization using 64 grayscale values. As shown in FIG. 8B, in the histogram obtained in the case of performing quantization using 64 grayscale values, the numbers of pixels for every four grayscale values are determined. For example, the number of pixels for a grayscale value of 0, the number of pixels for a grayscale value of 4, and the number of pixels for a grayscale value of 8, are determined. That is, the numbers of pixels for 256 grayscale values are determined as the numbers of pixels for grayscale values having no lower two bits. The numbers of pixels for only 64 grayscale values are therefore determined. As shown in FIG. 8B, for example, the numbers of pixels for grayscale values from 0 to 3 are counted to determine the number of pixels for a grayscale value of 3, and the numbers of pixels for grayscale values from 4 to 7 are counted to determine the number of pixels for a grayscale value of 7.

Figure 8C:
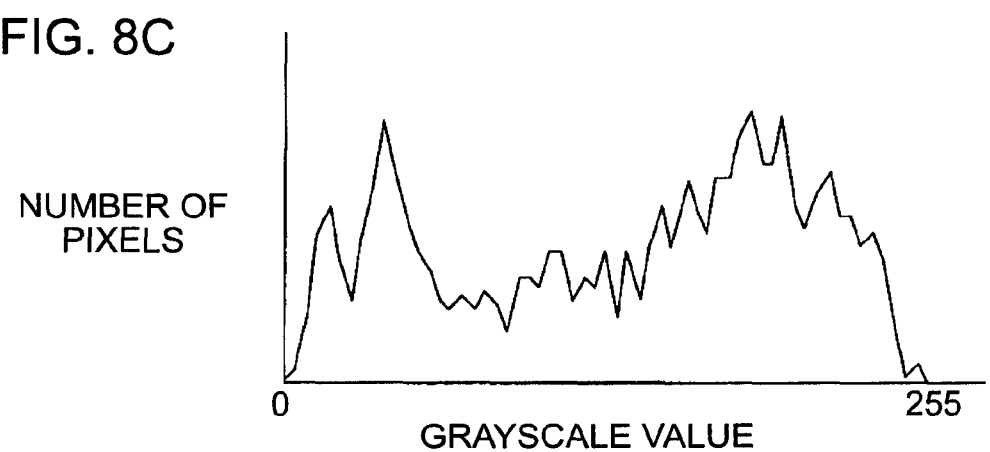

After a histogram is generated by performing the rough quantization, the number of levels of quantization in the histogram is converted back to 256. More specifically, the numbers of quantized pixels for grayscale values that are not selected as grayscale values in the event of performing quantization using 64 levels, i.e., the numbers of pixels for the grayscale values having lower two bits, are interpolated by proportion based on the numbers of pixels for grayscale values that are selected as grayscale values after performing quantization using 64 levels, i.e., the numbers of pixels for the grayscale values having no lower two bits because the number of pixels for a given grayscale value and the number of pixels for an adjacent grayscale value linearly change. For example, referring to FIG. 8B, the values representing the number of pixels for a grayscale value of 4, the number of pixels for a grayscale value of 5, and the number of pixels for a grayscale value of 6 are determined as values at points m4, m5, m6, respectively, on a line L between the number of quantized pixels for a grayscale value of 3 and the number of quantized pixels for a grayscale value of 7. Such linear interpolation is performed on the numbers of pixels, and the number of levels of quantization is converted back to 256. The resulting histogram is shown in FIG. 8C. As can be seen from the comparison between FIGS. 7B and 8C, the histogram shown in FIG. 8C in which the numbers of pixels are linearly interpolated after quantization is qualitatively closer to the histogram of high-resolution sampled image data shown in FIG. 8A than the histogram of low-resolution sampled image data shown in FIG. 7B. In the case of low-resolution sampled image data, therefore, a histogram determined by performing quantization using 64 grayscale values and performing linear interpolation on the number of pixels for each of the grayscale values that are not determined based on the quantized histogram to return the number of grayscale values to 256 is more reliable or less gap-toothed than the histogram generated by determining the numbers of pixels for all 256 grayscale values.

Even in a case where image data is sampled at a low resolution, therefore, a histogram is generated by performing rough quantization on the image data and then performing linear interpolation to return the number of grayscale values has a high reliability.

Since image data is converted into reduced-grayscale image data by performing quantization, it is effective to perform an area ratio gray-scale method, such as a dither method, during the quantization. In the dither method, pixels for grayscale values having lower two bits, such as grayscale values from 0 to 2 and grayscale values from 4 to 6, are allocated using a dither matrix as pixels for grayscale values that are selected at an appropriate ratio after quantization. Thus, the effect of the lower two bits of the grayscale values, such as grayscale values from 0 to 2 and grayscale values from 4 to 6, is maintained, and a more stable histogram can be generated. The stable histogram can be obtained from a low-resolution image, thereby achieving high-speed processing. The low-resolution image may be an image displayed on the display panel 35 or a small image. This serves to achieve higher-speed processing. This technique can be applied not only to images displayed on the display panel 35 but also to printed images output from the color printer 50. In the display device 30 or the like, the histogram generation technique described above can be used as background processing during the generation of low-resolution images. The digital camera 10 automatically generates small images, called thumbnails, of the large original images. The thumbnails are used to facilitate the viewing of files. The histogram generation method described above can be applied to the thumbnails, thereby rapidly obtaining statistic information of the original images.

Specific-Color Sampling and Enhancement Techniques

In general, it is desirable that memory colors, such as the colors of familiar objects such as human skin and blue sky, and characteristic colors, such as high-chroma colors, be replaced in advance by more good-looking colors than the actual colors captured by a camera (memory colors and characteristic colors are hereinafter referred to as "specific colors"). In the memory-color correction processing or saturation-correction processing discussed below, therefore, an amount by which to correct for a specific color is determined based on only a statistic value for the specific color. In low-resolution sampled image data, however, the ratio of the specific color is less reliable, and it is difficult to correctly determine the correction amount for the specific color.

In a specific-color enhancement technique according to an embodiment of the invention, when statistic values for only specific colors are determined based on low-resolution sampled image data, a histogram of the image data is generated according to the histogram generation method described above by quantizing the image data by 64 quantization levels and performing linear interpolation to return the quantization levels to 256. A statistic value for a specific color is determined based on the generated histogram, and a correction amount for the specific color is determined based on the statistic value for the specific color.

In low-resolution sampled image data, however, as also discussed above, the reliability of the ratio of the specific color is low. Thus, the correction-amount determining module M7 adjusts the correction amount for the specific color to be applied to the image data depending on the ratio of the pixels having the specific color in all pixels. The rate of the adjusted correction amount to the original correction amount for the specific color is hereinafter referred to as an "application rate".

Figure 9A:
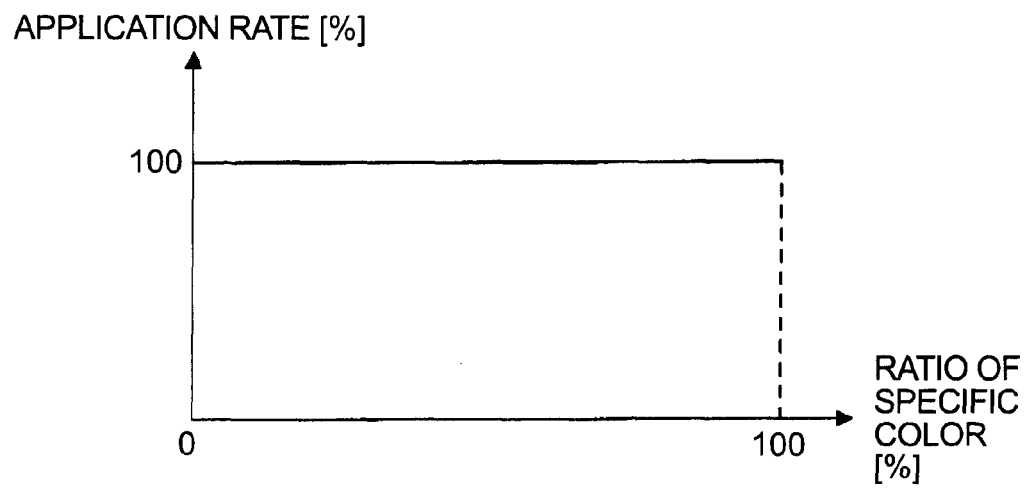
FIGS. 9A and 9B are diagrams showing the relationship between the ratio of a specific color and the application rate.
Figure 9B:
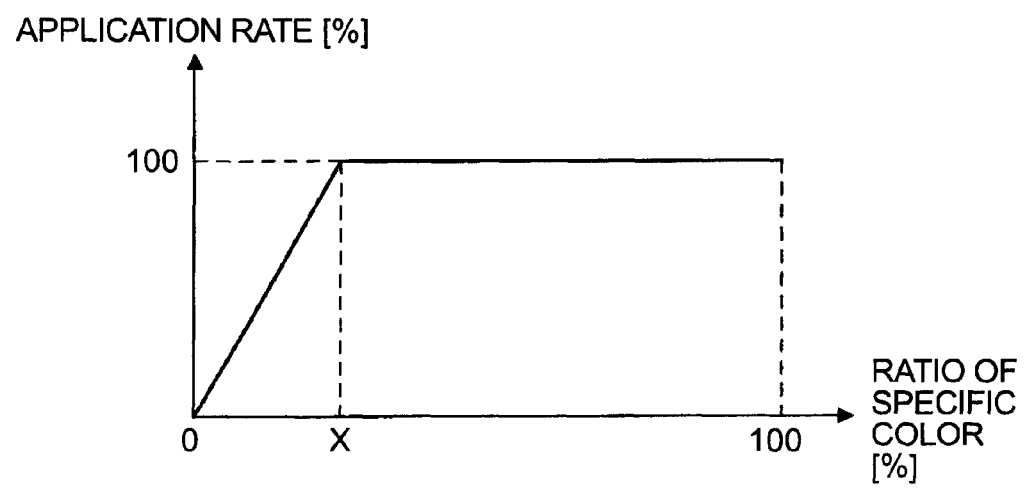

FIG. 9A shows the relationship between the ratio of a specific color in all pixels and the application rate for the specific color in a standard specific-color enhancement technique. FIG. 9B shows the relationship between the ratio of a specific color in all pixels and the application rate for the specific color in the specific-color enhancement technique according to this embodiment. In FIGS. 9A and 9B, the x-axis represents the ratio of the specific color, and the y-axis represents the application rate for the specific color.

In the standard specific-color enhancement technique shown in FIG. 9A, the correction amount for the specific color is always applied at 100 percent to the image data even if the ratio of the specific color in all pixels is low. In low-resolution sampled image data, however, the reliability of the ratio of the pixels having the specific color in all pixels is low. Thus, when the pixels of the specific color are found as a result of sampling, if the ratio of these pixels is low, there may be possibility of not needing to replace the pixels of the specific color with a good-looking color. For example, in the context of the color of human skin as a specific color, when it is indicated as a result of low-resolution sampling that the ratio of the color of human skin is low, it can be considered that human is less possibly shown. In such a case, according to the standard specific-color enhancement technique, the correction amount of the specific color is applied at 100 percent to cause the color of human skin to be exaggerated.

In the enhancement technique according to this embodiment shown in FIG. 9B, on the other hand, a threshold value X is set for the ratio of the specific color in all pixels. If the ratio of the specific color is greater than the threshold value X, the correction amount of the specific color is applied at 100 percent. If the ratio of the specific color is smaller than the threshold value X, the correction amount of the specific color is applied in proportion to the ratio of the specific color. Therefore, if the resolution of sampled image data is low and the reliability of the ratio of the specific color determined from the low-resolution image data is also low, the correction amount to be applied to the image can be adjusted by setting the threshold value X.

Image Data Sampling Supporting Backlight Correction

The statistic values determined using the histogram generation method described above in the case of sampling image data at a low resolution cause fewer errors than the statistic values determined in the case of sampling image data at a high resolution.

In an embodiment of the invention, the image data sampling technique is used in the context of backlight correction, as an example of image correction, to determine whether or not the image data is a backlit image. The backlit image is a dark and underexposure image that is obtained by capturing an object with insufficient light due to the metering failure because a background is lighter than the object.

Figure 10:
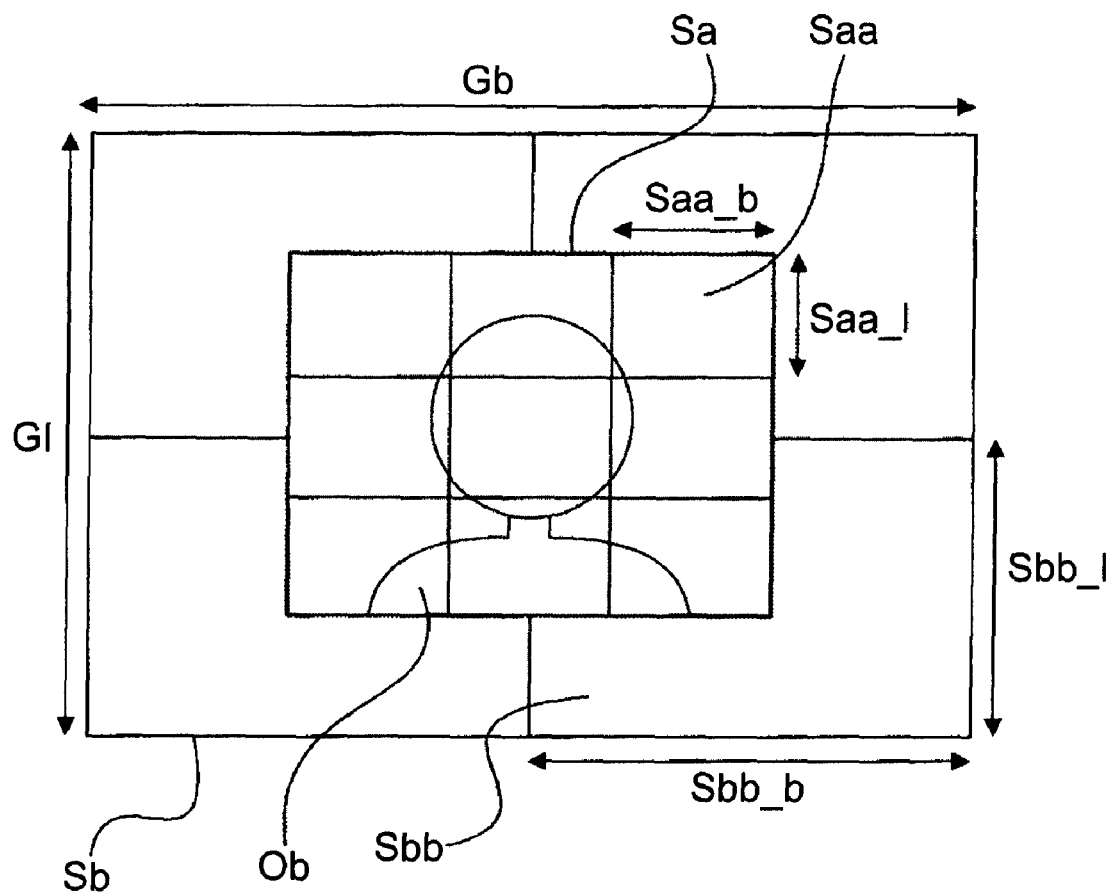
FIG. 10 is a diagram showing an image that is divided into a central divisional area and a surrounding divisional area.

FIG. 10 illustrates divisional areas of an image to be subjected to backlight correction. In most cases, as shown in FIG. 10, an object Ob is located at the center. The image is divided into a central divisional area Sa including the object Ob, and a divisional area surrounding the central divisional area Sa. The surrounding divisional area Sb does not include a portion overlapping the central divisional area Sa. The central divisional area Sa of the image is further divided into nine central-area sub-regions Saa, and the surrounding divisional area Sb is further divided into four surrounding-area sub-regions Sbb. In this embodiment, each of the central-area sub-regions Saa has a height Saa_l and width Saa_b that are ⅓ of a height Gl and width Gb of the image, and each of the surrounding-area sub-regions Sbb has a height Sbb_l and width Sbb_b that are ½ of the height Gl and width Gb of the image. Since the surrounding-area sub-regions Sbb do not include portions overlapping the central divisional area Sa, the surrounding-area sub-regions Sbb are L-shaped regions. In backlight correction processing, a high-brightness value is applied to the nine central-area sub-regions Saa of the central divisional area Sa including the dark object Ob, and a low-brightness value is applied to the four surrounding-area sub-regions Sbb of the surrounding area Sb. This backlight correction processing changes the color of the central divisional area Sa including the object Ob to brighter. Thus, the object Ob is also changed to a brighter object. In the backlight correction processing for the image data, the correction-amount determining module M7 determines a correction amount so that a different brightness value can be applied to each of the central divisional area Sa and the surrounding divisional area Sb.

FIG. 11 shows the sizes of each of the central-area sub-regions Saa and the sizes of each of the surrounding-area sub-regions Sbb for some resolution standards. For example, the image resolution of VGA is 640 dots×480 dots. The size of each of the central-area sub-regions Saa is 128 dots×96 dots, which is ⅕ of the VGA resolution, and the size of each of the surrounding-area sub-regions Sbb is 320 dots×240 dots, which is ½ of the VGA resolution.

In backlight correction processing, first, it is determined whether or not an image of interest is a backlit image. In the following description, it is determined whether or not the image of interest is a backlit image using the low-resolution image data sampling technique described above.

Figure 12:
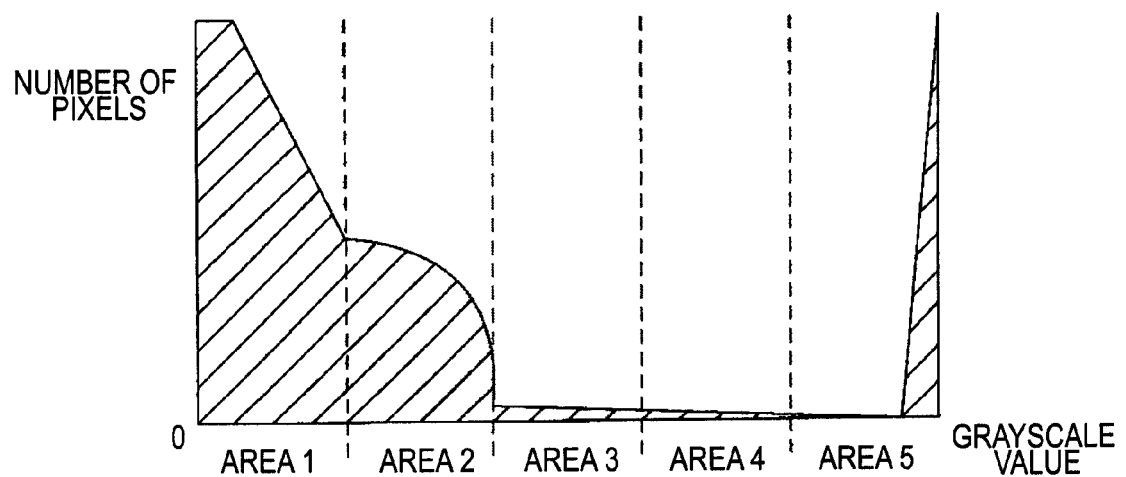
FIG. 12 is a typical histogram of a backlit image.

FIG. 12 shows a characteristic histogram of a backlit image. A backlit image empirically exhibits such a characteristic histogram profile. Thus, it is determined whether or not an image of interest is a backlit image by generating a histogram of image data of interest and comparing the generated histogram with the characteristic histogram of the backlit image. More specifically, in the characteristic histogram of the backlit image and the generated histogram of the image data of interest, grayscale values are divided into five areas (area 1 to area 5), and the number of pixels that reside in each area is checked.

Since this determination method is carried out based on a histogram of an entire image in which an object and a background are not separated from each other, an image including a bright object and a dark background may be determined as a backlit image. Thus, an exemption condition for such an image determined as a backlit image using this method is set by performing comparison on a brightness value of each of the divisional areas described above.

The image data analyzing module M6 performs low-resolution sampling on each of the nine central-area sub-regions Saa of the central divisional area Sa and the four surrounding-area sub-regions Sbb of the surrounding divisional area Sb of the image shown in FIG. 10 to generate histograms according to the above-described histogram generation method, and determines statistic values for the sub-regions Saa and Sbb.

The correction-amount determining module M7 determines average brightness values based on the statistic values of the image, and also determines a difference between the maximum average brightness value and the minimum average brightness value in the determined average brightness values. If the difference between the maximum average brightness value and the minimum average brightness value is greater than a predetermined value and the sub-region having the maximum average brightness value is included in the central divisional area Sa, the image is not regarded as a backlit image even though it is determined according to the determination method described above that this image is a backlit image. With the use of this exemption condition in addition to the above-described backlit-image determination method, it can more accurately be determined whether or not the image of interest is a backlit image.

The low-resolution sampling technique described above can also be applied to the sub-regions Saa and Sbb of the central divisional area Sa and the surrounding divisional area Sb.

FIG. 13 shows the resolutions of each central-area sub-region Saa and the resolutions of each surrounding-area sub-region Sbb for typical resolution standards, and the numbers of pixels sampled at resolutions. In FIG. 13, the "number of pixels in central area" indicates the number of pixels in each of the central-area sub-regions Saa, and the "number of pixels in surrounding area" indicates the number of pixels in each of the surrounding-area sub-regions Sbb. For example, a VGA image has a resolution of 640 dots×480 dots, and the number of all pixels is 307200 (dots). The number of pixels in each of the central-area sub-regions Saa is given by 128×96=12288 (dots), and the number of pixels in each of the surrounding-area sub-regions Sbb is given by 320×240=49152 (dots). When the central-area sub-regions Saa and the surrounding-area sub-regions Sbb are sampled at a resolution that is $1/256$ of the resolution of the original image, the number of pixels in each of the sampled central-area sub-regions Saa is 48 (dots) and the number of pixels in each of the sampled surrounding-area sub-regions Sbb is 192 (dots). In this embodiment, a resolution of a sampled sub-region is determined by dividing the resolution of the original image by a predetermined multiple of 4, such as 32, 64, 128, or 256. This is because the resolutions of typical standards, such as QVGA and QQVGA, are multiples of $1/4$ of the VGA resolution, such as $1/4$ and $1/16$ of the VGA resolution, respectively. By dividing the resolution of the original image by a predetermined multiple of 4 to determine the resolution for sampling, a plurality of resolution standards in which the numbers of pixels in each central-area sub-region Saa sampled at resolutions are the same and the numbers of pixels in each surrounding-area sub-region Sbb sampled at resolutions are the same can be determined.

For example, in the QVGA resolution standard, the number of pixels in each of the central-area sub-regions Saa is given by 64×48=3072 (dots) and the number of pixels in each of the surrounding-area sub-regions Sbb is given by 160×120=12288 (dots). When the central-area sub-regions Saa and the surrounding-area sub-regions Sbb are sampled at a resolution that is $1/64$ of the original resolution, the number of pixels in each of the sampled central-area sub-regions Saa is 48 (dots) and the number of pixels in each of the sampled surrounding-area sub-regions Sbb is 192 (dots). Since the number of pixels in each of the central-area sub-regions Saa and the number of pixels in each of the surrounding-area sub-regions Sbb in the case of sampling VGA image data at a resolution that is $1/256$ of the original resolution are the same as those in the case of sampling QVGA image data at a resolution that is $1/64$ of the original resolution, the operation of determining statistic values for these two cases can be commonly used. By dividing the resolution of the original image by a predetermined multiple of 4 to determine the resolution for sampling, the operation of determining some statistic values for each of the central-area sub-regions Saa and each of the surrounding-area sub-regions Sbb can be commonly used.

Accordingly, in backlight correction processing, it is determined whether or not an image of interest is a backlit image by comparing a typical histogram of a backlit image with a histogram of entire image data. In this case, a histogram of the image data is generated by performing low-resolution sampling, thus achieving high-speed processing. Further, an exemption condition is set for each of the central divisional area and the surrounding divisional area of the image based on the average brightness value of each sub-region, and a statistic value of each sub-region is determined. In the event of determining a statistic value of each sub-region, low-resolution sampling is also performed for each sub-region to determine the statistic value, thus achieving high-speed processing. The resolution of low-resolution sampling is determined by dividing the original resolution of the image data by a multiple of 4. Thus, the operation of determining the statistic value can be shared.

Image Processing in Control Circuit

Figure 14:
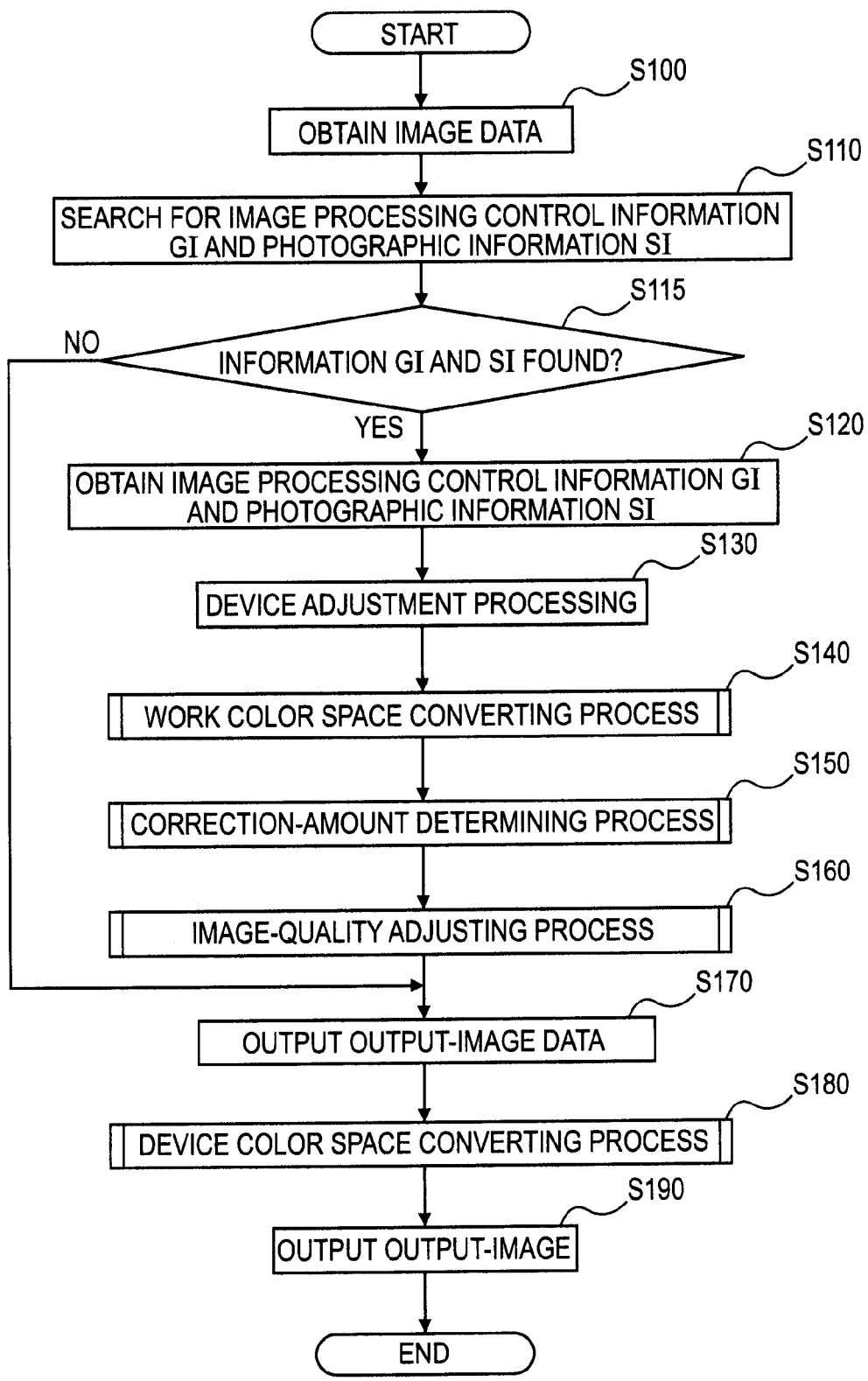
FIG. 14 is a flowchart showing a main routine for image processing.
Figure 15:
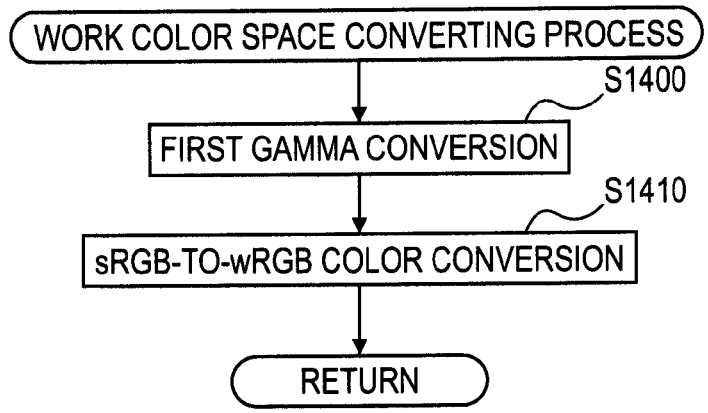
FIG. 15 is a flowchart showing a routine for a work color space converting process.
Figure 16:
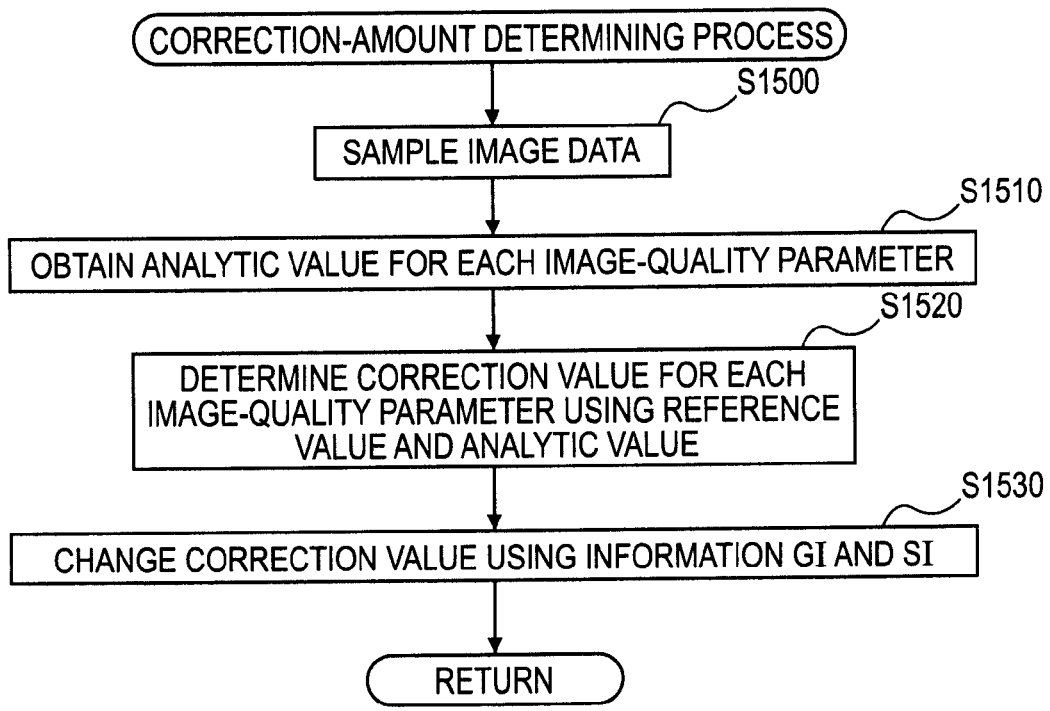
FIG. 16 is a flowchart showing a routine for a correction-amount determining process.
Figure 17:
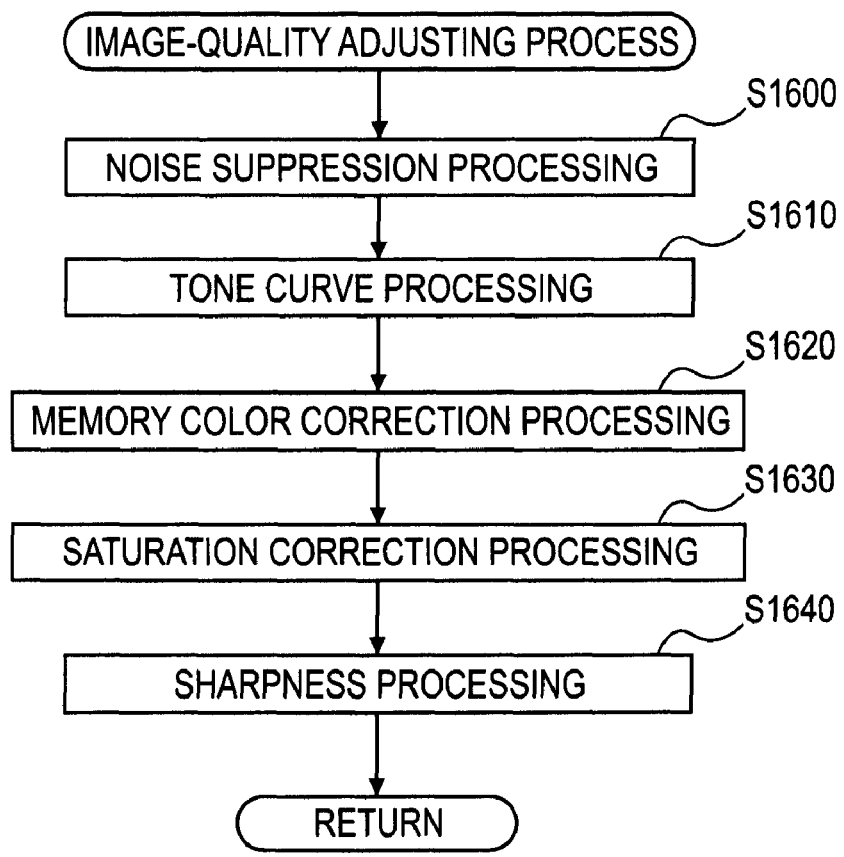
FIG. 17 is a flowchart showing a routine for an image-quality adjusting process.
Figure 18:
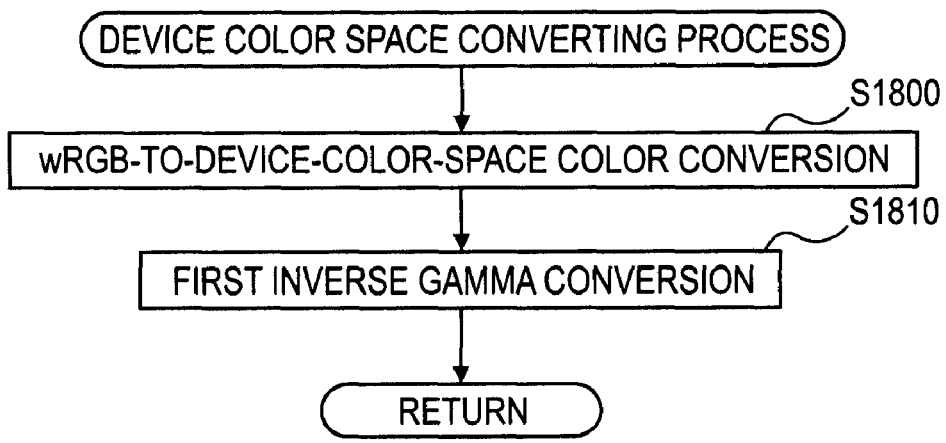
FIG. 18 is a flowchart showing a routine for a device color space converting process.

Image processing performed by the portable device 20, the display device 30, or the color printer 50 according to an embodiment of the invention will now be described with reference to FIGS. 14 to 18. FIG. 14 is a flowchart showing the main routine for the image processing performed by the portable device 20, the display device 30, or the color printer 50 according to this embodiment. FIG. 15 is a flowchart showing a routine for work color space conversion processing performed by the portable device 20, the display device 30, or the color printer 50 according to this embodiment. FIG. 16 is a flowchart showing a routine for correction-amount determination processing performed by the portable device 20, the display device 30, or the color printer 50 according to this embodiment. FIG. 17 is a flowchart showing a routine for image-quality adjustment processing performed by the portable device 20, the display device 30, or the color printer 50 according to this embodiment. FIG. 18 is a flowchart showing a routine for device color space conversion processing performed by the portable device 20, the display device 30, or the color printer 50 according to this embodiment.

The image processing performed according to this embodiment may be started by, for example, selecting desired image data GD via keypads, a touch panel, or the like in the portable device 20, the display device 30, or the color printer 50. Alternatively, the image processing may be performed when the image data GD is received by the portable device 20, the display device 30, or the color printer 50.

When starting the image processing, the control circuit 60 (the CPU 601a or 601b) obtains the selected image data GD and temporarily stores it in the RAM 602a or 602b (step S100). The image data GD may be selected by the digital still camera 10 connected to the portable device 20, the display device 30, or the color printer 50 via wired or wireless communications, or may be selected by the portable device 20, the display device 30, or the color printer 50 from image data GD stored in the memory card MC. Alternatively, the image data GD may be selected from a plurality of image data items GD stored on a server via a network.

The CPU 601a or 601b searches for the image processing control information GI and photographic information SI associated with the selected image data GD (step S110). The CPU 601a or 601b searches the header of the image data GD. Alternatively, the CPU 601a or 601b searches a network or the memory card MC for the image processing control information GI and the photographic information SI in the form of different file format associated with the image data GD. If the CPU 601a or 601b finds (searches for) the image processing control information GI and the photographic information SI (Yes in step S115), the CPU 601a or 601b obtains the image processing control information GI and the photographic information SI (step S120). If the CPU 601a or 601b fails to find (search for) the image processing control information GI or the photographic information SI (No in step S115), the CPU 601a or 601b proceeds to step S170 without performing image-quality adjustment processing using the image processing control information GI and the photographic information SI.

After obtaining the image processing control information GI and the photographic information SI in step S120, the CPU 601a or 601b performs device adjustment processing (step S130). As stated above, the image processing control information GI is generally optimized for a combination of a specific image generating device and a specific image output device, e.g., the print-image display device, which is a function of the color printer 50. In general, displayed output images and printed output images largely differ from each other in terms of color gamut and visual appearance, i.e., the difference between transmitted images and reflected images, and therefore have different optimum white balance values, contrast values, and saturation values. The quality of an output image on the display panel 21 of the portable device 20, the display panel 31 of the display device 30, or the display panel 35 of the color printer 50 is therefore different from the quality of a printed image output from the color printer 50.

In this embodiment, therefore, for example, the image processing control information GI is adjusted using adjustment information preset for each device for allowing the quality of the output image displayed on the display panel 21, 31, or 35 to be equal to or similar to that of the printed image output from the color printer 50. The adjustment information may be difference information representing a difference between display parameters and image quality parameters recorded in the image processing control information GI. The display parameters are image quality parameters for allowing the portable device 20, the display device 30, or the color printer 50 to display an image with a similar quality level to that of a printed image. Alternatively, the adjustment information may include new display parameters to be used in place of the image quality parameters recorded in the image processing control information GI.

For example, liquid crystal panels have largely different image output characteristics from one panel to another. Thus, the adjustment information is desirably preset for each liquid crystal panel. The adjustment information may be recorded in the image processing control information GI as a portion thereof, or may be stored in the HDD/ROM 603a or 603b as adjustment information unique to each of the portable device 20, the display device 30, and the color printer 50. Alternatively, the adjustment information may be dynamically generated by the portable device 20, the display device 30, or the color printer 50 based on the image processing control information GI.

The adjustment information may include information (e.g., differences between parameters or substitution parameters) relating to, for example, but not limited to, information specifying white points, contrast adjustment information, saturation adjustment information, color hue adjustment information, information indicating noise suppression ON/OFF, and information indicating sharpness processing ON/OFF.

(1) Since the color temperature is different between individual image output devices, the white points are specified to adjust the color temperature. For example, if the display color temperature is high (e.g., 9300 K), the white points may be specified as R=(237, 255), G=(255, 251), and B=(255, 222). Then, images can be displayed on the display panels 21, 31, and 35 with the color balanced to some extent.

(2) Since the reproducible (usable) color gamut is different between individual image output devices, a difference in contrast occurs to make resulting images appear very different. Thus, by adjusting the tone curve, the contrast of images displayed on the display panels 21, 31, and 35 can be matched to some extent.

(3) Since the saturation is different between individual image output devices, it is necessary to adjust the saturation so that, for example, the printed image output from the color printer 50 can visually be matched to the output images output on the display panels 21, 31, and 35.

(4) If the printed image output from the color printer 50 and the output images output on the display panels 21, 31, and 35 differs in color hue, the adjustment information can be used to implement adjustment to a color space conversion matrix, correction for memory colors, and hue-saturation-brightness-based (HSB-based) adjustment with the color gamut specified.

The CPU 601a or 601b performs work color space conversion processing for converting the color space of the obtained image data GD into the work color space (step S140). The work color space conversion processing will be described with reference to FIG. 15. In the work color space conversion processing, the color space of the image data GD is converted into the color space for use in image-quality adjustment for the image data, that is, the work color space. A color space having a wider color gamut used as the work color space enhances the effective use of pixel data forming the image data subjected to the image-quality adjustment processing.

In this embodiment, the color space of the image data GD is converted from sRGB color space, which is generally used as RGB color space, to wRGB color space having a wider color gamut than the sRGB color space.

Since the image data GD obtained from the digital still camera 10 is typically YCbCr color space data, the image data GD is first converted into sRGB color space image data, which is generally used for image processing. The matrix S, which is known to those skilled in the art, is used to perform YCbCr-to-RGB color conversion. If the obtained image data GD is sRGB data, color conversion using the matrix S is not needed. In the following description, it is assumed that the image data GD is sRGB color space image data.

The CPU 601a or 601b performs first gamma conversion on the image data GD (step S1400). Color conversion is generally performed by means of a device-independent color space, such as XYZ or Lab, and matrix-based sRGB-to-XYZ color conversion and XYZ-to-wRGB color conversion are performed. The input/output characteristics (gamma characteristics) of the image data GD is made linear to increase the accuracy of the color conversion. The gamma value used in this processing is a gamma value typical to inverse-gamma conversion to be performed by the digital still camera 10 to generate image data.

The CPU 601 performs matrix-based sRGB-to-XYZ color conversion and XYZ-to-wRGB color conversion on the linear image data GD to convert the color space of the image data GD to the wRGB color space, which is a work color space (step S1410). Then, this routine ends, and returns to the main routine shown in FIG. 14.

Referring back to FIG. 14, the CPU 601a or 601b performs correction-amount determining processing (step S150). The correction-amount determining processing will now be described with reference to FIG. 16. In the correction-amount determining processing according to this embodiment, as discussed above, a correction amount to be used for automatic image-quality adjustment for allowing the parameters relating to the quality of the image data GD to be equal to or close to the reference values is determined.

The CPU 601a or 601b samples the image data GD or rough data of the image data GD (e.g., thumbnail image data) according to the low-resolution sampling method described above (step S1500). The CPU 601a or 601b obtains an analytic value (statistic value and characteristic value) for each of the parameters (image quality parameters) relating to the quality of the image data GD from each of the sampled pixel data (step S1510).

The CPU 601a or 601b obtains a preset reference value for each of the image quality parameters, and determines a correction value for each of the image quality parameters using the reference value and the analytic value (step S1520).

The CPU 601a or 601b changes the correction value determined for each of the image quality parameters using the image processing control information GI and the photographic information SI (step S1530). Then, this routine ends, and returns to the main routine shown in FIG. 14. With the use of the image quality characteristics generated depending on a combination of an image data generating device and an image output device and the photographic conditions for each image data generated, information (conditions) that cannot be obtained merely by analyzing the image data GD can be reflected in the correction values determined according to the quality of the image data GD. In this embodiment, the image processing control information GI is adjusted based on the adjustment information so that the quality of an image output on the display panel 21, 31, or 35 is comparable to a printed image output from the color printer 50. The difference in image quality (appearance) caused by different image output characteristics of image output devices can therefore be eliminated or reduced.

More specifically, if the correction values are used for increasing or decreasing the analytic values of the image quality parameters, the image processing control information GI and the photographic information SI are used to change the level of the increase or decrease. If the correction values are used as new image quality parameters, the image processing control information GI and the photographic information SI are used to set the new parameters. If the image processing control information GI includes parameters that are manually set by a photographer by intention, the manually set parameters may be added to the correction values.

The CPU 601*a* or 601*b* performs image-quality adjustment processing on the image data GD using the changed correction values (step S160). The image-quality adjustment processing will now be described with reference to FIG. 17. The CPU 601*a* or 601*b* performs noise suppression on the image data GD (step S1600). The noise suppression may be turned on or off by the adjustment information, or the level of noise suppression may be adjusted by the adjustment information. The noise suppression processing is relatively high-load computation processing. The effect of noise suppression adjustments is not normally noticeable in display panels having small screen sizes. In the portable device 20 typically having a small-screen display, therefore, the noise suppression processing may be skipped in view of the high computation load and the weak effect of noise suppression adjustments.

The CPU 601*a* or 601*b* adjusts the tone curve using the adjusted correction values, and performs image-quality adjustment processing on the image data GD using the tone curve (step S1610). The image-quality adjustment processing using the tone curve is performed for adjusting the image quality parameters for brightness, color balance, and contrast. The tone curve may be adjusted by, for example, changing a tone curve point with respect to a correction point set for each of the image quality parameters.

The CPU 601*a* or 601*b* replaces the colors corresponding to the preset memory colors with colors defined as the memory colors (step S1620). As the memory colors, such as the color of human skin, the color of sky, the color of green, and red, good-looking colors are defined in advance.

The CPU 601*a* or 601*b* performs saturation correction processing (step S1630). Given values (Rb, Gb, and Bb) that have not been corrected, values (Ra, Ga, Ba) that have been corrected, and correction values (R, G, B), the saturation correction processing using the correction values is performed by using the following equations:

$$R_a = \left(R_b - \left(\frac{R_b + G_b + B_b}{3}\right)\right) \times \frac{R}{100} + R_b$$

$$G_a = \left(G_b - \left(\frac{R_b + G_b + B_b}{3}\right)\right) \times \frac{G}{100} + G_b$$

$$B_a = \left(B_b - \left(\frac{R_b + G_b + B_b}{3}\right)\right) \times \frac{B}{100} + B_b$$

The memory colors and the correction values for saturation are adjusted using the specific-color enhancement technique described above based on the ratio of the memory colors and the characteristic colors in all pixels.

The CPU 601*a* or 601*b* performs sharpness processing (step S1640). Then, the image-quality adjustment processing flow ends, and returns to the main routine shown in FIG. 14. The sharpness may be turned on or off by the adjustment information, or the level of sharpness may be adjusted by the adjustment information. The effect of sharpness adjustments is not normally noticeable in display panels having small screen sizes. In the portable device 20 typically having a small-screen display, therefore, the sharpness processing may be skipped in view of the weak effect of sharpness adjustments, as well as reduction of the computation load.

In step S170, the CPU 601*a* or 601*b* outputs the resulting image data. In step S180, the CPU 601*a* or 601*b* performs device color space conversion processing for converting the color space of the image data GD subjected to the image-quality adjustment processing to the device color space. The device color space conversion processing will now be described with reference to FIG. 18. In the device color space conversion processing, the color space of the image data GD is converted from the work color space used for performing image-quality adjustment processing to the color space of each image output device. Most displays adapted to display and output images are typically color-designed so as to satisfy the sRGB color space. However, some displays are color-designed based on unique color spaces.

The CPU 601*a* or 601*b* performs matrix-based wRGB-to-XYZ color conversion and XYZ-to-sRGB color conversion or XYZ-to-device-color-space color conversion, or lookup-table-based wRGB-to-sRGB color conversion or wRGB-to-device-color-space color conversion on the linear image data GD to convert the color space of the image data GD to the device color space (step S1800).

The CPU 601*a* or 601*b* performs first inverse-gamma conversion on the image data GD (step S1810). Then, this routine ends, and returns to the main routine shown in FIG. 14. That is, the gamma characteristics of the image data GD are changed so as to be matched to the gamma characteristics of the display panel 21, 31, or 35. More specifically, inverse-gamma conversion is performed using the gamma values of the display panel 21, 31, or 35.

The CPU 601*a* or 601*b* causes an output image to be displayed via the display driving controller 63*a* or 63*b*. Then, this routine ends.

As is to be understood from the foregoing description, in the portable device 20, the display device 30, or the color printer 50 according to an embodiment of the invention, the image processing control information GI defined for a combination of the digital still camera 10 and the print-image display device of the color printer 50 is used to display and output an image on the display panel 21, 31, or 35 with a quality comparable to the quality of a printed image output from the color printer 50. That is, although the image output characteristics of the display panels 21, 31, and 35 are different from those of the color printer 50, the difference in appearance (image quality) caused by the difference in image output characteristics can be eliminated or reduced by adjusting the image processing control information GI using the adjustment information. Thus, the image processing control information GI defined for a specific image output device is used to allow the quality of output images from any other image output device to be equal to or close to the quality of images output from the specific image output device.

In this embodiment, the image processing control information GI may not be preset for each image output device. The adjustment information can be used to allow a plurality of image output devices to output an image with a quality equal to or close to the quality of an image output from a specific image output device.

What is claimed is:

1. An image processing apparatus comprising:
   an image data obtaining circuit that obtains image data having first image data and second image data of a lower resolution than the first image data, the image data being capable of having a first number of grayscale values;
   a sampling circuit that samples the image data;
   a statistic value determining circuit that determines a statistic value based on statistic information of a histogram, the histogram being created by quantizing the sampled image data into a second number of grayscale values less than the first number of grayscale values and linearly interpolating the quantized data back into the first number of grayscale values;
   a correction-amount determining circuit that determines a first correction amount to be used for image processing to the first image data and a second correction amount to be used for image processing to the second image data based on the statistic value; and
   an image processing circuit that performs the image processing to the first image data according to the first correction amount and performs the image processing to the second image data according to the second correction amount.

2. The image processing apparatus according to claim 1, wherein the correction-amount determining circuit includes a correction-amount adjusting circuit that determines a ratio of pixels having a specific color in all pixels based on the sampled image data and that adjusts the correction amount according to the ratio of the pixels having the specific color.

3. The image processing apparatus according to claim 1, wherein an image defined by the image data is divided into a central area and a surrounding area surrounding the central area, and
   the sampling circuit includes a divisional area sampling circuit that samples the image data in the central area and the surrounding area at a low resolution.

4. The image processing apparatus according to claim 3, wherein the correction-amount determining circuit includes a backlit-image determining circuit that determines whether or not the image data is backlit image data using the histogram and a statistic value that is determined based on sampled image data in the central area and the surrounding area.

5. An image processing method comprising:
   obtaining image data having first image data and second image data of lower resolution than the first image data, the image data being capable of having a first number of grayscale values;
   sampling the image data;
   determining a statistic value based on statistic information of a histogram, the histogram being created by quantizing the sampled image data into a second number of grayscale values less than the first number of grayscale values and linearly interpolating the quantized data back into the first number of grayscale values;
   determining a first correction amount to be used for image processing of the first image data and a second correction amount to be used for image processing of the second image data based on the statistic value; and
   performing the image processing to the first image data according to the first correction amount and performing the image processing to the second image data according to the second correction amount,
   wherein at least one of the above steps are performed by a processor.

6. A computer-readable storage medium storing an image processing program to be executed by an image processing apparatus including a control circuit to cause the image processing apparatus to function as:
   an image data obtaining unit that obtains image data having first image data and second image data of lower resolution than the first image data, the image data being capable of having a first number of grayscale values;
   a sampling unit that samples the image data;
   a statistic value determining unit that determines a statistic value based on statistic information of a histogram, the histogram being created by quantizing the sampled image data into a second number of grayscale values less than the first number of grayscale values and linearly interpolating the quantized data back into the first number of grayscale values;
   a correction-amount determining unit that determines a first correction amount to be used for image processing of the first image data and a second correction amount to be used for image processing of the second image data based on the statistic value; and
   an image processing unit that performs the image processing to the first image data according to the first correction amount and performs image processing to the second image data according to the second correction amount.

* * * * *